United States Patent

Tatsutomi

[15] 3,682,151
[45] Aug. 8, 1972

[54] EXHAUST GAS RECYCLE SYSTEM FOR A ROTARY PISTON INTERNAL COMBUSTION ENGINE

[72] Inventor: Yasuo Tatsutomi, 478-62 Nahayama-cho, Hiroshimi-shi, Hiroshima-ken, Japan

[73] Assignee: Toyo Kogyo Company Limited, Aki-cun, Hiroshima-ken, Japan

[22] Filed: Nov. 9, 1970

[21] Appl. No.: 87,668

[30] Foreign Application Priority Data

Nov. 8, 1969 Japan ............... 44/106062

[52] U.S. Cl. .................. 123/119 A, 123/8.01
[51] Int. Cl. ................................. F02b 33/00
[58] Field of Search ............. 123/119 A, 8.01

[56] References Cited

UNITED STATES PATENTS

| | | | |
|---|---|---|---|
| 3,507,261 | 4/1970 | Myers et al. | 123/119 A |
| 3,298,330 | 1/1967 | Ito et al. | 123/8.01 |
| 3,513,816 | 4/1970 | Daigh | 123/119 A |
| 3,500,807 | 3/1968 | Daigh | 123/119 A |
| 3,237,615 | 3/1966 | Daigh | 123/119 A |
| 1,552,819 | 9/1925 | Brush et al. | 123/119 A |
| 3,446,190 | 5/1969 | Bensinger et al. | 123/8.01 |
| 3,102,816 | 9/1963 | Gist et al. | 123/8.01 |
| 3,319,611 | 5/1967 | Terazawa | 123/8.01 |

Primary Examiner—C. J. Husar
Attorney—Sughrue, Rothwell, Mion, Zinn & Macpeak

[57] ABSTRACT

A rotary piston internal combustion engine having a three or more apexed rotary piston moving in planetary motion within a casing formed by a center wall having a trochoidal inner peripheral surface and end walls disposed at both sides of the center wall and intake and exhaust passages provided in the end wall and/or center wall includes a conduit communicating between the intake and exhaust passages. The conduit is disposed in the neighborhood of the engine coolant jacket within the casing and a control valve opening and closing in response to the operating states of the engine is disposed in the conduit within the casing and the recycling exhaust gas and control valve are cooled by the engine coolant.

1 Claim, 1 Drawing Figure

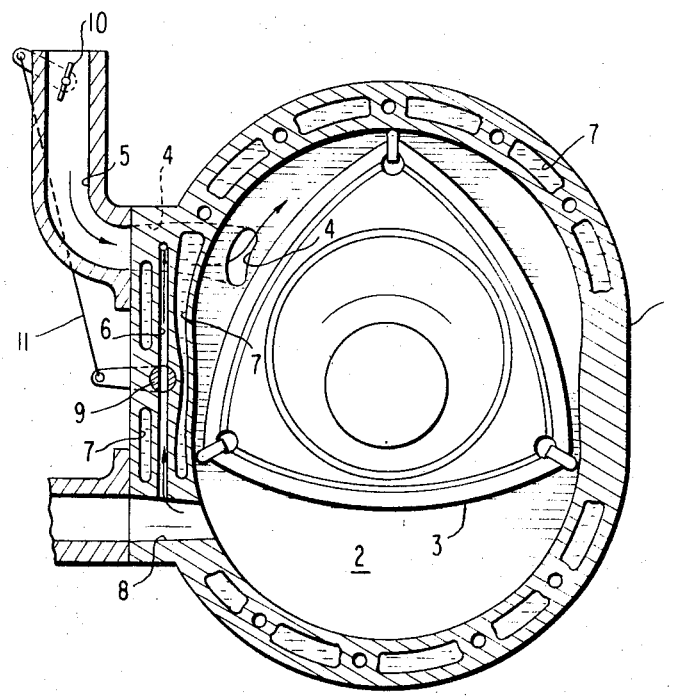

3,682,151

EXHAUST GAS RECYCLE SYSTEM FOR A ROTARY PISTON INTERNAL COMBUSTION ENGINE

BACKGROUND OF THE INVENTION

1. FIELD OF THE INVENTION

This invention relates to an exhaust gas recycle system for reducing the nitrogen oxide contained within the exhaust gas of a rotary piston internal combustion engine.

2. DESCRIPTION OF THE PRIOR ART

Generally, in order to remove the detrimental components such as nitrogen monoxide or nitrogen dioxide contained within the exhaust gas being discharged from the internal combustion engine, it is known to supply part of the exhaust gas to the intaken mixture gas so as to lower the combustion efficiency of the engine. In the conventional exhaust gas recycle device which has the valve for supplying part of the exhaust gas to the intaken mixture gas in response to the engine operating state, problems such as deterioration of the valve by the high temperature exhaust gas and blockage of the conduit recycling the exhaust gas have occurred. Though it is already known to provide the exhaust gas recycle conduit in the neighborhood of the inlet passage of the carburetor to cool the exhaust gas by means of the latent heat of the vaporization, the cooling efficiency of the exhaust of such device is limited. At the same time, the valve itself is not cooled so that the valve is at high temperature and has low durability. Further, conventional exhaust gas recycle systems have complicated structures around the intake and exhaust manifold including the valve and pipings for recycling the exhaust gas and require large space for such structure.

SUMMARY OF THE INVENTION

It is, therefore, an object of the present invention to provide an exhaust gas recycle system for a rotary piston internal combustion engine which comprises a conduit disposed in the neighborhood of the cooling water jacket within the casing of the rotary piston engine for passing part of exhaust gas into the intake mixture for reducing nitrogen oxide and which readily cools the exhaust gas passing through the conduit to delete the disadvantages of the conventional systems.

It is another object of the present invention to provide an exhaust gas recycle system of the type in which a control valve is provided in a casing for controlling the quantity of the exhaust gas introduced into an intake passage through a conduit in response to the engine operating state so as to cool it by the engine cooling water in order to improve the durability of the control valve and at the same time eliminate the aforementioned disadvantages.

This invention also provides an exhaust gas recycle system for a rotary piston internal combustion engine which cools the exhaust gas introduced into an intake passage and the control valve by the engine cooling water to prevent the generation of combustion products such as carbon in order to eliminate the blockage of the conduit and inoperability of the valve. This invention also simplifies the structure in the neighborhood of the intake and exhaust gas manifolds and reduces the space needed for the same.

BRIEF DESCRIPTION OF THE DRAWINGS

The other objects, features and advantages of the present invention will become apparent from the following description taken in conjunction with the accompanying drawing, in which: the single FIGURE is a front sectional view of one embodiment of this invention of an exhaust gas recycle system for a rotary piston internal combustion engine.

DESCRIPTION OF THE PREFERRED EMBODIMENT

Reference numeral 1 refers to a center wall of a rotary piston internal combustion engine having an inner peripheral surface of trochoid configuration and end walls 2 disposed at both sides of the center wall 1. A rotary piston 3 moves in planetary motion so that it slides the apices thereof in contact with the inner peripheral surface of the center wall 1. The casing having the center wall 1 and end walls 2 forms a plurality of working chambers within the piston to perform the intake, compression, explosion-expansion and exhaust process. An intake passage 4 is provided in the casing such as, for example, end wall 2 and communicates with an intake manifold 5 connected to a carburetor. A conduit 6 is bored in the casing, for example, in the neighborhood of a passage 7 for cooling water of the center wall 1 and is connected at one end, to an exhaust passage 8 of the center wall 1 while connected at the other end to the intake passage 4. A control valve 9 opens or closes the conduit 6 and is connected to a lever 11 as to operate in response to the opening of throttle valve 10 of the carburetor.

It follows that the greater the opening of the throttle valve 10, the larger the opening of the control valve 9 and vice versa. Accordingly, if the engine is operated in the state where the throttle valve 10 opens to a predetermined opening, the exhaust gas in the exhaust process chamber of the engine passes through the exhaust passage 8 into the atmosphere. Whereupon, since the control valve 9 opens the conduit 6 to an extent in response to the opening of the throttle valve 10, part of the exhaust gas passing through the exhaust passage 8 passes through the conduit 6 wherein it is cooled by the cooling water of the casing and introduced into the intake passage 4. Thus cooled exhaust gas is mixed with the intake mixture gas fed from the carburetor via the intake passage 4 and into the intake process chamber of the engine and then to the combustion process chamber. The fuel cooled upon mixing with the intake mixture gas and exhaust gas becomes the exhaust gas. The exhaust gas incompletely burned in the combustion process of the engine, that is, the detrimental components such as nitrogen monoxide and nitrogen dioxide within the exhaust gas are extremely reduced prior to final discharge into the atmosphere. Further, as the throttle valve 10 is opened further, the control valve 9 also opens further within the conduit 6, and accordingly a greater part of the exhaust gas passing through the exhaust passage 8 is introduced into the conduit 6 and intake passage 4. It means that since the exhaust gas in response to the quantity of the intake mixture gas passing through the intake passage 4 is supplied from the conduit 6, into the intake mixture gas, the combustion efficiency of the engine becomes lowered so that the detrimental components such as nitrogen monoxide and nitrogen dioxide contained within the exhaust gas are reduced.

Since the rotary piston internal combustion engine of the present invention has structural advantages, that is, the intake passage and exhaust passage are disposed on the same side so as to be spaced at proper distance, it is easy to cool the control valve by water by providing the control valve therebetween, and it is also assumed that the conduit for connecting both may have a sufficient length for properly cooling the exhaust gas.

It should also be understood that since the invention is thus constructed, when part of the exhaust gas at high temperature normally passing through the exhaust passage 8, passes through the conduit 6, it is cooled by the cooling water of the casing so as to be mixed with the intake mixture gas so that new intake mixture gas or fuel having impurity of exhaust gas is cooled prior to introduction into the engine. As the result, the combustion efficiency of the engine is lowered so that it largely reduces the detrimental components such as nitrogen monoxide and nitrogen dioxide, reducing pollution of the atmosphere by the exhaust gas introduced into the atmosphere and the blockage of conduit 6 may also be eliminated.

It should also be understood that since the present invention comprises a control valve 9 disposed in the neighborhood of the passage 7 for the cooling water of the casing, it is not deformed by the high temperature exhaust gas so as to largely improve the durability thereof. Further, it should also be understood that since the present invention does not need additional space for installing the valve device and piping for recycling the exhaust gas, the structure in the neighborhood of the intake and exhaust gas manifolds of the engine becomes very simple.

Though the other detrimental components such as carbon monoxide and hydrocarbon within the exhaust gas discharged into the atmosphere are increased if part of the exhaust gas is introduced into the intake mixture gas of the engine as aforesaid so that the combustion efficiency of the engine is lowered, if exhaust gas purifying device such as catalyst device or reburning device may be provided in the exhaust gas system of the engine, and these detrimental components may be removed.

Though in the aforementioned embodiment, the control valve 9 opens or closes in proportion to the opening of the throttle valve 10 of the carburetor, it may be so set as to open at some optimum opening in consideration with the performance of the engine. Further, it should also be understood that the control valve 9 of this invention may be further selectively controlled depending upon the operating state of the engine as defined by engine temperature and intake vacuum.

WHAT IS CLAIMED IS:

1. In a rotary piston internal combustion engine having a casing including two laterally spaced parallel end walls interconnected by a generally annular center wall, a rotary piston having circumferentially spaced apices which form a plurality of working chambers within said casing and perform intake, compression, explosion-expansion and exhaust processes as the piston planetarily rotates, an intake passage on one side of said generally annular center wall for introducing a fuel-air mixture and an exhaust passage on the same side and spaced therefrom for expelling an exhaust gas, the improvement comprising:

a conduit extending within said casing and between said exhaust passage and said intake passage for recycling the exhaust gas, said conduit being surrounded by coolant passages, and a control valve carried by said conduit intermediate of said conduit connections to said intake and exhaust passages and being in close heat transfer position with respect to said coolant passages surrounding said conduit carrying the same.

* * * * *